UNITED STATES PATENT OFFICE.

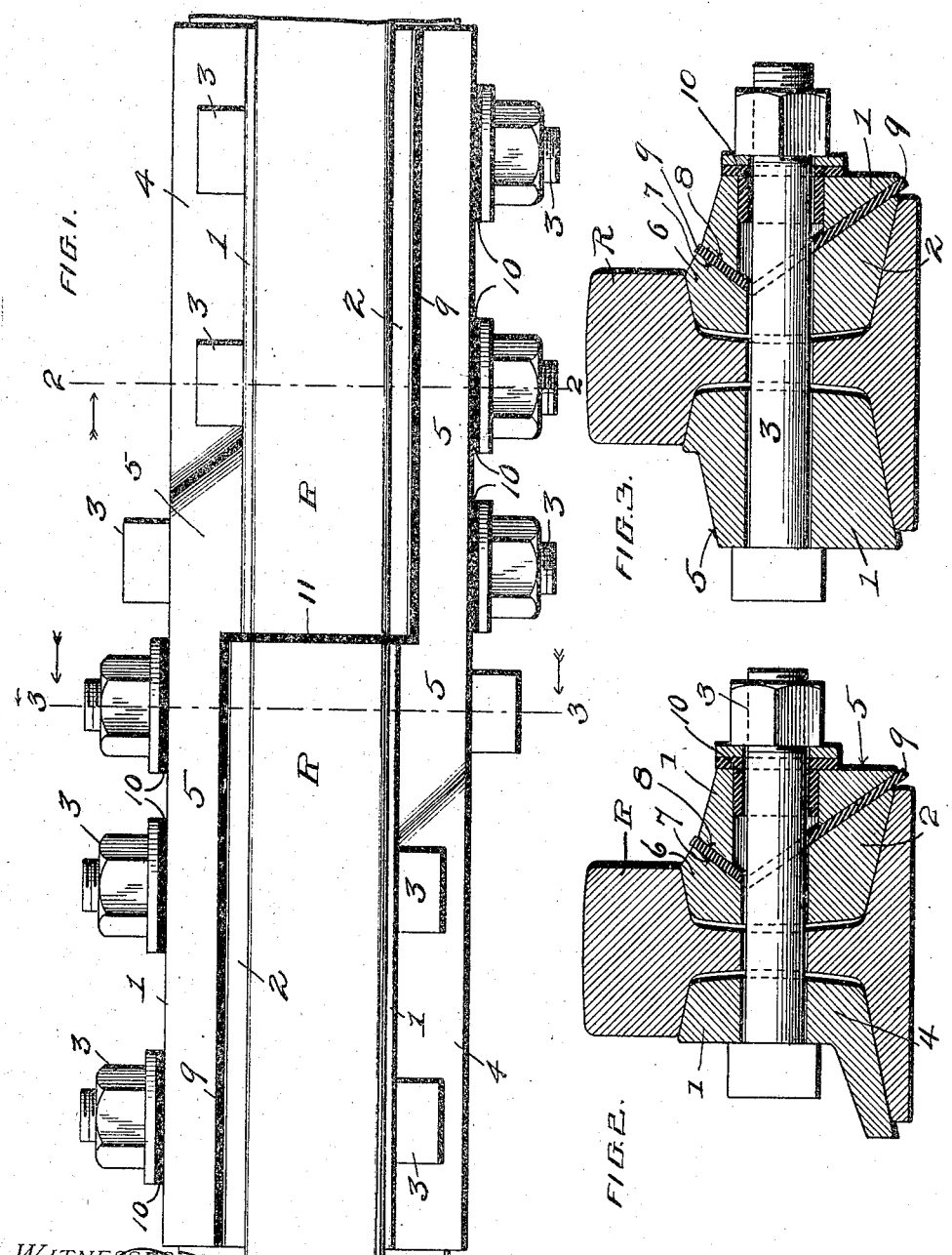

CHRISTIAN J. BUCK, OF GALLITZIN, PENNSYLVANIA, ASSIGNOR TO THE RAIL JOINT COMPANY, OF NEW YORK, N. Y., A CORPORATION OF NEW YORK.

INSULATED RAIL-JOINT.

995,842.  Specification of Letters Patent.  Patented June 20, 1911.

Application filed February 23, 1909. Serial No. 479,301.

*To all whom it may concern:*

Be it known that I, CHRISTIAN J. BUCK, a citizen of the United States, residing at Gallitzin, in the county of Cambria, State of Pennsylvania, have invented certain new and useful Improvements in Insulated Rail-Joints, of which the following is a specification.

This invention relates to rail joints of the insulated type, and has special reference to certain novel and practical improvements therein designed to provide a metallic bearing support at the under sides of the rail heads, and also to maintain an effective insulation throughout the joint.

The primary object of the invention is to provide a construction wherein the bearing area for the insulating material is increased to a greater extent than the area of the contact between the under sides of the rail heads and the joint bars. Hence it is proposed by the present invention to provide a construction of insulated rail joint in which the structure is simplified, also to provide a solid metal support for the rails, and to provide an enlarged bearing surface for the splice bars and filler members between which the insulating material is held, the flanged or overhanging top portion of the filler members exposed to the insulating material being of greater area than the under surface of the rail head. Therefore, the combination and arrangement of parts claimed herein, serves to increase in a practical manner, the bearing area for the insulating material, and to decrease the fiber strain, thus enabling the material to better withstand the load imposed.

The invention is necessarily susceptible to structural modification without departing from the spirit or scope thereof, but a practical embodiment thereof is shown in the accompanying drawings in which:—

Figure 1 is a top plan view of an insulated rail joint constructed in accordance with the present invention. Fig. 2 is a vertical cross section view on the line 2—2 of Fig. 1. Fig. 3 is a similar sectional view on the line 3—3 of Fig. 1.

Like references designate corresponding parts in the several figures of the drawings.

A rail joint constructed in accordance with the present invention is characterized by the employment of outer continuous splice bars, inner filler members, interposed between the splice bars and the rails, and suitable insulation between the splice bars and filler members; the said filler members being constructed with projections or flanges arranged to overlie or partly overlie, the splice bars and having bearing faces for the insulation whose area is greater than the area of the under sides of the rail heads, thus providing an increased bearing for the insulation with a consequent reduction of the fiber strain. This general combination and arrangement of parts is susceptible to embodiment in various forms of construction but is well exemplified by the design of joint shown in the drawings, to which particular reference will now be made.

The insulated rail joint shown in the drawings comprises the service rails R—R outer continuous splice bars 1—1 inner filler members 2—2 and the usual series of joint bolts 3. The oppositely arranged splice bars 1 extend the full length of the rail joint, and each of said bars along one end portion thereof is preferably of plain angle bar formation as indicated by the reference 4, and this angle part 4 is designed to fit in the fishing space of one of the rails and have a direct metallic engagement with the under side of the rail head and with the upper side of the rail flange. Beyond the angle bar part 4, each splice bar 1 is provided with a thickened offset 5 extending across the joint between the meeting ends of the rails, and this offsetting is continued to the opposite end of the bar arranged at the side of the other rail. The offset part of the splice bar arranged at the side of one of the rails is preferably constructed with an angular or approximately V shaped inner face which opposes a correspondingly shaped outer face for the outer side of a filler member 2. By reason of the angular formation or angular recessing of the outer side of each filler member 2, the latter is provided at its upper edge with an outturned projection or flange 6 having a direct contact with the under side of the rail head and also provided with a bearing face 7 opposing a corresponding bearing face 8 on the adjacent splice bar, which bearing faces are of greater area than the area of the under side of the rail head.

It will be observed, in the form of construction described, that each splice bar 1 has a direct bolted connection at one end with one of the rails while the other end of said splice bar is offset from the side of the other rail and a filler member 2 is interposed between said rail and said offset portion of the splice bar. Insulating material 9 is interposed between the aforesaid angular faces of each filler member and the coöperating part of the splice bar and to complete the insulation of the joint suitable bolt insulation 10 is supplied for the ends of the bolts passing through and engaging the splice bars, and an insulating end post 11 is interposed between the rail ends, all of which is plainly shown in the several figures of the drawings.

In carrying forward the invention it is preferred to arrange the splice bars and filler members upon opposite sides of the rails in alternate relation, that is, to have one of the splice bars bolted directly to one of the rails and the opposite splice bar bolted directly to the other rail and with a corresponding alternation of the filler members, although it will be understood that it is within the purview of the invention to have both ends of the joint alike with filler members and insulation upon both sides of each rail to provide what is known in the art as a two-end insulated joint, and it is also within the purview of the invention to have both splice bars bolted directly to the same rail, and the filler members and insulation 9 likewise associated with the same rail.

As hereinbefore indicated the primary object of the invention is to provide an insulated rail joint wherein the bearing area for the insulating material at the underside of the flange or overhanging top portion of the filler members is increased to a greater extent than the area of the contact between the under sides of the rail heads and the joint bars, thus serving to distribute the pressure of the load upon the insulation over a bearing area of such increased extent as to very materially decrease the fiber strain and enable the material to better withstand the load imposed, consequently greatly increasing the life of the insulation as well as its general efficiency. A contact of opposing parts over the entire area of said bearing surfaces, with a practically uniform distribution of pressure upon the insulation, is necessary to insure full efficiency and commercial possibilities in the joint. It is therefore essential to the successful carrying out of the invention that the parts of the joint be so constructed as to combine with the joint fastenings in a manner to maintain, under all conditions, the said increased area of bearing contact upon the insulating material. This is accomplished, in the present invention, by the peculiar formation of the splice bars and filler members, in connection with the feature of each filler member not only directly engaging the under side of the rail head but also having direct engagement with the upper side of the rail flange. Specifically, it will be observed that each filler member is provided at its outer side with an angular recess, the one face of which slopes upwardly and outwardly, and the other face of which recess slopes downwardly and outwardly, while the splice bar has a correspondingly shaped inner side registering within said recess and against the interposed insulation. By reason of this construction the filler members are so braced between the rail heads and rail flanges as to make it impossible for them to cant out of position and thus restrict the area of contact for the insulation to substantially a line of contact, which result would defeat the very purpose of the invention; and, furthermore, the peculiarly formed recess in each filler member and the correspondingly shaped inner side for the splice bar provide a construction which causes the splice bars, when adjusted inwardly by the joint bolts, to have an oblique movement to take up wear or to adapt the parts to variations in thickness of insulation or to variations in thicknesses of the splice bars and filler members themselves, thus eliminating the possibilty of a relative vertical movement between the splice bars and filler members being created from either of these causes (which possibility is met in actual service) without provision for correcting or avoiding the same. In other words, the present applicant provides a construction having closely abutting joint parts, (and an increased bearing area for the insulating material beneath the rail heads), and also having reliable and permanent adjusting means for maintaining the increased area of bearing contact upon the insulating material under conditions where take-up is necessary for wear, as well as on account of the variations in thicknesses of material as above referred to.

I claim:—

1. An insulated rail joint comprising splice bars, filler members abutting the rail and in contact with the under side of its head, said members having projections extending therefrom, insulating members interposed between said filler members and the splice bars, the area of said projections exposed to said insulating members being of a greater area than the area of the under side of the rail head, and means engaging said splice bars for securing the parts in assembled position, said splice bars and filler members having means coöperating with the securing means for maintaining the increased area of bearing contact upon the insulation.

2. In an insulated rail joint, splice bars secured directly to one rail and having projections deflected therefrom and overlapping the other rail, filler members engaging the under side of the rail head and the web of the rail, said members having projections extending therefrom, insulating members engaging said filler members and the splice bars, the area of said projections exposed to said insulating members being of a greater area than the area of the under side of the rail head, and means engaging said splice bars for securing the parts in assembled position, said splice bars and filler members having means coöperating with said securing means for maintaining the increased area of bearing contact upon the insulation.

3. In an insulated rail joint, the combination of filler members, splice bars, insulating members therebetween, and adjustable joint fastenings; each filler member directly engaging the under side of the rail head and the upper side of the rail flange, and provided with an upper bearing face for the insulation of a greater area than the area of the underside of the rail head, and the splice bar having an upper portion underlying the said bearing face of the filler member and a lower portion overlying that part of the latter which engages and overlies the rail flange, said splice bars and filler members having means coöperating with the joint fastenings for maintaining the increased area of bearing contact upon the insulation.

4. In an insulated rail joint, the combination of filler members, splice bars, interposed insulating members, and adjustable joint fastenings; each filler member directly engaging the under side of the rail head and the upper side of the rail flange and provided with an upper bearing face for the insulation of a greater area than the area of the under side of the rail head, and said splice bars and the insulating members having portions which overlie that part of the filler member which engages and overlies the rail flange, the said splice bars and filler members also having means coöperating with the joint fastenings for maintaining the increased area of bearing contact upon the insulation.

5. In an insulated rail joint, the combination with the filler members, splice bars, interposed insulation and adjustable joint fastenings; each filler member having at its outer side an angular recess, the lower face of which lies oblique to a vertical plane, and the splice bar having a correspondingly shaped side registering within said recess and against the interposed insulation.

6. In an insulated rail joint, the combination with filler members, splice bars, interposed insulation, and adjustable joint fastenings; each filler member having at its outer side an angular recess, the lower face of which slopes downwardly and outwardly above the rail flange and toward the outer edge of the latter, and the splice bar having a correspondingly shaped inner side registering within said recess and against the interposed insulation.

7. In an insulated rail joint, the combination of filler members, splice bars, interposed insulation, and adjustable joint fastenings; each filler member having at its outer side an angular recess, the upper face of which is of greater area than the area of the under side of the rail head, and the lower face of which lies oblique to a vertical plane, and the splice bar having a correspondingly shaped outer side registering within said recess and against the interposed insulation.

8. In an insulated rail joint, the combination of filler members, splice bars, interposed insulation, and adjustable joint fastenings; each filler member having at its outer side an angular recess, one face of which slopes upwardly and outwardly, and the other face of which slopes downwardly and outwardly, and the splice bar having a correspondingly shaped inner side registering within said recess and against the interposed insulation.

In testimony whereof I hereunto affix my signature in the presence of two witnesses.

CHRISTIAN J. BUCK.

Witnesses:
E. F. SCHERMERHORN,
MARY E. STEPHENS.

---

Copies of this patent may be obtained for five cents each, by addressing the "Commissioner of Patents, Washington, D. C."